(12) United States Patent
Campbell

(10) Patent No.: US 9,903,414 B2
(45) Date of Patent: Feb. 27, 2018

(54) BEARING DEVICE INCLUDING A CLAMPING RING

(71) Applicant: AKTIEBOLAGET SKF, Göteborg (SE)

(72) Inventor: Andrew Campbell, East Kilbride (GB)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 14/779,618

(22) PCT Filed: Mar. 27, 2013

(86) PCT No.: PCT/EP2013/056472
§ 371 (c)(1),
(2) Date: Sep. 24, 2015

(87) PCT Pub. No.: WO2014/154257
PCT Pub. Date: Oct. 2, 2014

(65) Prior Publication Data
US 2016/0076586 A1     Mar. 17, 2016

(51) Int. Cl.
| | |
|---|---|
| *F16C 32/00* | (2006.01) |
| *F16C 41/04* | (2006.01) |
| *F16C 25/06* | (2006.01) |
| *F16C 19/38* | (2006.01) |
| *F16C 19/52* | (2006.01) |
| *F16C 41/00* | (2006.01) |
| *F16C 43/04* | (2006.01) |

(52) U.S. Cl.
CPC ............ *F16C 25/06* (2013.01); *F16C 19/386* (2013.01); *F16C 19/522* (2013.01); *F16C 19/525* (2013.01); *F16C 19/527* (2013.01); *F16C 41/008* (2013.01); *F16C 43/04* (2013.01); *F16C 2233/00* (2013.01); *F16C 2300/14* (2013.01)

(58) Field of Classification Search
CPC .... F16C 19/386; F16C 19/522; F16C 19/525; F16C 19/527; F16C 25/06; F16C 25/083; F16C 41/008; F16C 43/04; F16C 2233/00
See application file for complete search history.

(56) References Cited

U.S. PATENT DOCUMENTS

| | | | | |
|---|---|---|---|---|
| 5,685,068 | A | * | 11/1997 | Bankestrom ............ F16C 25/06 29/407.08 |
| 6,508,592 | B1 | * | 1/2003 | Perni ..................... F16C 19/522 384/1 |
| 9,284,949 | B2 | * | 3/2016 | Pick ........................ F16C 19/38 |
| 2003/0218548 | A1 | | 11/2003 | Sato et al. |
| 2004/0074315 | A1 | | 4/2004 | Hwang |
| 2016/0039434 | A1 | * | 2/2016 | Van Der Ham ........ B61F 15/20 301/108.1 |

FOREIGN PATENT DOCUMENTS

| | | |
|---|---|---|
| EP | 1134443 A2 | 9/2001 |
| EP | 1293766 A1 | 3/2003 |

(Continued)

*Primary Examiner* — James Pilkington
(74) *Attorney, Agent, or Firm* — Bryan Peckjian; SKF USA Inc. Patent Dept.

(57) ABSTRACT

A bearing device including a clamping ring for retaining and preloading a bearing in a housing, and a sensor unit for detecting at least one state variable of the bearing. The sensor unit is embedded in a recess of the clamping ring.

9 Claims, 6 Drawing Sheets

(56) References Cited

FOREIGN PATENT DOCUMENTS

| | | | |
|---|---|---|---|
| EP | 1681479 | A1 | 7/2006 |
| EP | 2290250 | A2 | 3/2011 |
| JP | 2003056551 | A | 2/2003 |
| WO | 0201086 | A2 | 1/2002 |
| WO | 2006118946 | A1 | 11/2006 |

* cited by examiner

BEARING DEVICE INCLUDING A CLAMPING RING

CROSS REFERENCE TO RELATED APPLICATION

This is a United States National Stage Application claiming the benefit of International Application Number PCT/EP2013/056472 filed on 27 Mar. 2013, which is incorporated herein by reference in its entirety.

FIELD OF THE INVENTION

It is known to use clamping rings for retaining and preloading bearings, in particular split outer rings of bearing, in a housing. Split outer rings or split inner rings are used in particular for double row bearings as applied in heavy load applications such as wind turbines, generators or ship propeller bearings. The invention is applicable to any such bearing structure, in particular to bearing structures used in the latter fields of application.

BACKGROUND OF THE INVENTION

Taper roller bearings or bearings with split rings are often mounted using clamping rings for retaining and preloading a bearing in a housing. In the case of wind turbines, the rotor is supported in a housing via at least two bearings, which are usually formed as large-size cylindrical roller bearings, in particular including at least one double row taper roller bearing in O-configuration.

Bearing assemblies of this type have to support large angular momenta in directions perpendicular to the rotation axis of the bearing and may therefore be subject to strain deformations. Damages of the rollers or the raceways may cause vibrations and/or heat and it is important to efficiently monitor the devices, in particular using remote systems, in order to be able to timely stop the apparatus and to prevent major damages.

Sensors for this purpose are usually provided on an outer surface of the housing or of the clamping ring, where the measured values may be degraded as compared to direct measurements due to the lack of direct contact.

Further, externally mounted sensor units are susceptible to damages due to unintended collisions with the housing and the like.

SUMMARY OF THE INVENTION

It is an object of the invention to solve the above problems of the prior art and to provide a reliable way of integrating a sensor unit in a bearing device as described above.

The invention starts from a bearing device including a clamping ring for retaining and preloading a bearing ring in a housing and a sensor unit for detecting at least one state variable of the bearing. The state variable may include vibrations, acoustic emissions, temperature, strain or load and the sensor unit may include suitable sensors.

It is proposed that the sensor unit is embedded in a recess of the clamping ring.

The embedding in the recess of the clamping ring allows for a more direct contact between the sensor and the bearing, in particular the outer or the inner ring of the bearing, while at the same time protecting the sensor unit from unintended collisions and other detrimental influences from the outside.

It is further proposed that the bearing device includes the bearing, which may in particular be formed as a large-size roller bearing, with at least one split ring, wherein the clamping ring is configured to abut with an axial end face of the ring or of one part of the split ring.

The position of the sensor unit in the retaining or clamping ring is particularly suitable for measuring strain deformations of the bearing ring, which are more likely to occur in the outer ring of the bearing. In principle, the invention could also be applied to clamping rings retaining an inner ring of a bearing on an axle or on a shaft.

The advantages of the invention are most effective when the outer diameter of the ring retained by the clamping ring amounts to at least 300 mm, because the recess may be formed sufficiently small as compared to the overall size of the clamping ring and because the problem of strain deformation is of particular relevance in this case.

Further, it is proposed that the bearing is formed as a double-row taper roller bearing in O-configuration.

A further aspect of the invention relates to a wireless transmitter for transmitting signals obtained by the sensor, which may be integrated in the sensor unit. The provision of the wireless transmitter facilitates the monitoring of the apparatus having the bearing assembly and the robustness of the entire assembly may be further increased because communication lines may be avoided.

Further, it is proposed that the recess opens towards a bearing side of the clamping ring, such that at least one contact plate of the sensor unit is in direct contact with the axial end face of one ring of the bearing. It should be noted that the expressions "axial", "radial" and "circumferential" refer to the cylindrical coordinates with the rotation axis of the bearing taken as central axis, whereas "axially inward" or "axially outward" refers to the inside and the outside of the housing.

Preferably, a bottom face of the sensor unit including the contact plate is provided with an O-ring preventing the penetration of oil or other liquids into the contact area between the contact plate and the axial end face of the bearing ring.

In a preferred embodiment, the sensor unit includes an arc-shaped housing, which is adapted to the curvature of the bearing ring to be monitored, in particular such that the curvature of the housing is at least approximately equal to the curvature of the ring in contact with the contact plate of the sensor unit. The expression "equal" is to be interpreted in a wide sense here, i.e. the shown curvature or a main curvature of the housing should be somewhere close to or inside the range between the curvature of the radially inner face of the bearing ring and the curvature of the radially outer surface of the bearing ring.

Preferably, the sensor unit includes at least one temperature and/or one acoustic emission and/or one vibration sensor. Further, one or more temperature sensors may be provided.

A weakening of the clamping ring resulting from the recess may be compensated for by providing a reinforcing structure of the clamping ring in the vicinity of the recess. The reinforcing structure may be a portion with increased thickness or increased width of the clamping ring, reinforcing ribs or the like.

A further aspect of the invention relates to a control unit for controlling or monitoring an apparatus including a bearing device as described above. The control unit is configured to receive data from the sensor unit, in particular using the wireless transmitter, and to generate status information and/or warning signals based on the received data.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

BRIEF DESCRIPTION OF THE FIGURES

The invention will now be described in more detail for explanatory, and in no sense limiting, purposes, with reference to the following figures, in which.

DETAILED DESCRIPTION OF THE EMBODIMENTS

Figure 1:
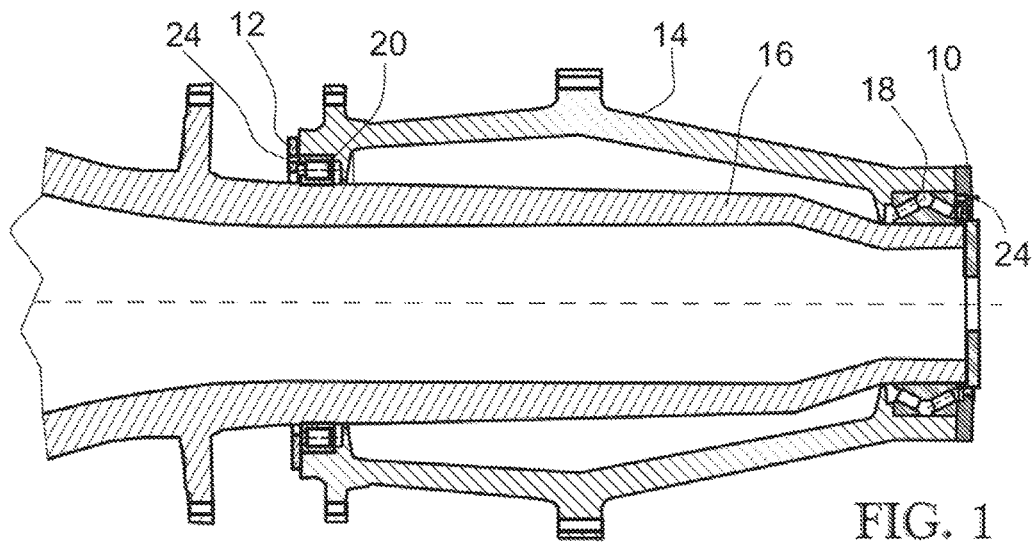
FIG. 1 is a sectional view of a bearing arrangement of a wind turbine including two clamping rings according to the invention.

FIG. 1 is a cross sectional view of a bearing arrangement of a wind turbine including a first clamping ring 10 on the rear side remote from the turbine rotor (not shown) and a second clamping ring 12 on the front side of the housing 14 supporting the shaft 16 of the rotor. The shaft 16 is supported in the housing 14 via a first roller bearing 18 formed as a double rotator roller bearing and a second roller bearing 20 on the front side formed as a single row roller bearing.

The axially inner sides of the outer rings, i.e. the axial sides facing towards the center of the housing 14 abut with shoulders in the housing and are retained and preloaded on their axially outer sides by the clamping rings 10, 12 respectively.

Figure 2:
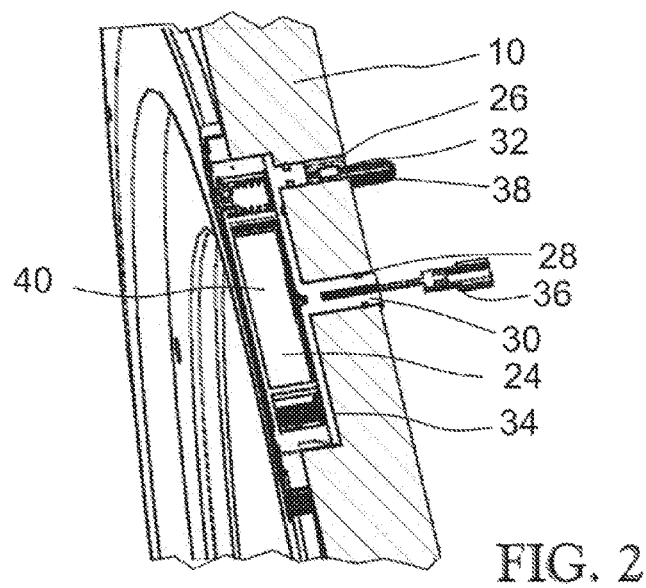
FIG. 2 is a partial sectional view of a first clamping ring of the assembly of FIG. 1.

FIG. 2 is a partial sectional view of the first clamping ring 10 of the assembly of FIG. 1. As illustrated, the clamping ring 10 is provided with a recess on the axially inner side facing the axially outer side of the outer ring of the bearing 18 and a sensor unit 24 is fitted into the recess 22. The bottom surface of the recess is provided with two bores 26, 28 and two axially projecting rod-like channels 30, 32 are fitted into the bores 26, 28. The first channel 30 of a housing 34 of the sensor unit 24 guides a connector wire 36 of the sensor unit 24 axially outside of the clamping ring 10 and a second channel 32 of the housing 34 receives an antenna 38 of the wireless transmitting unit 40 provided in the sensor unit 24.

Figure 3:
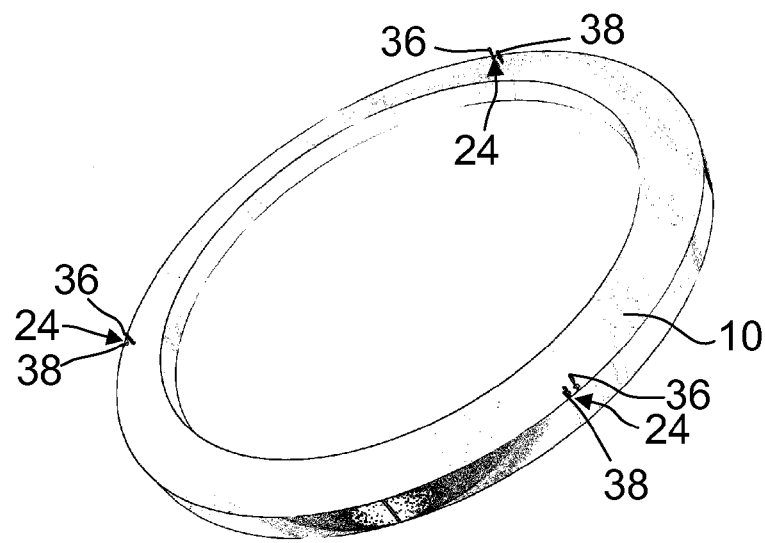
FIG. 3 is a perspective view of a backside of the clamping ring of FIG. 2.
Figure 4:
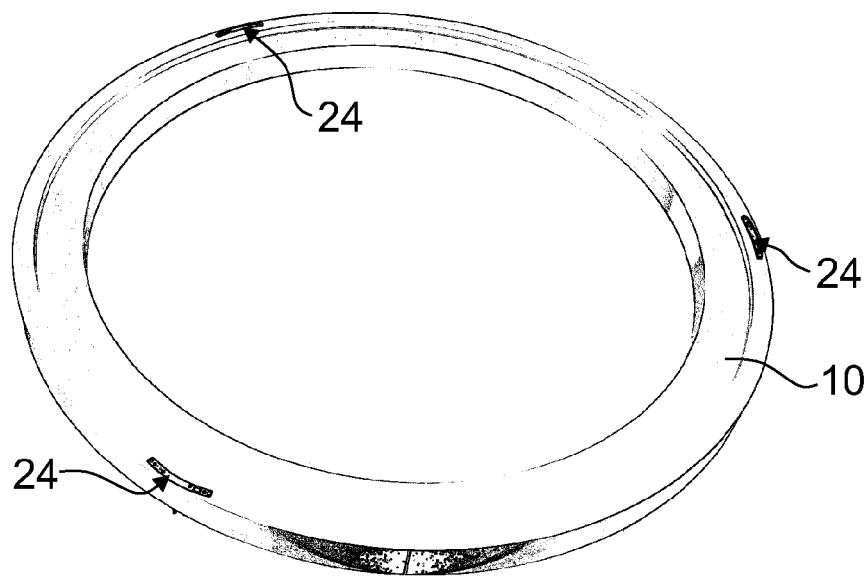
FIG. 4 is a front side view of the clamping ring of FIG. 2.

FIG. 3 is perspective view of the backside, i.e. of the axially outer side of the clamping ring 10 of FIG. 2 and it is illustrated that both the connector wire 36 with a pertinent connector and the antenna 38 protrude over the axial end face of the clamping ring 10. It is to be noted that the bores for bolts fixing the clamping ring 10 on the housing 14 are not illustrated in FIGS. 3 and 4. A total of three sensor units 24 with pertinent and recesses 22 is provided in the clamping ring 10 (FIG. 4). The sensor units 24 are isotopically distributed over the circumference of the clamping ring 10.

The recesses 22 and the housing 24 have a basically identical shape such that the housing 34 of the sensor unit 24 can be easily fitted into the recesses 22. The shape of the recesses 22 and of the housing then viewed from in the axial direction and the curvature of the recess and the housing correspond to the curvature of a circle with a radius corresponding to the respective radial positions with regard to the rotation axis of the bearings 18, 20 and of the shaft 16.

FIG. 4 is a front side view of the clamping ring of FIGS. 2 and 3 and it is illustrated that the contact surfaces of the sensor units 24 including various contact plates is arranged essentially flush with the contact surface of the clamping ring 10, which is supposed to come in contact with the axial end face of the outer ring of the roller bearing 18.

Figure 5:
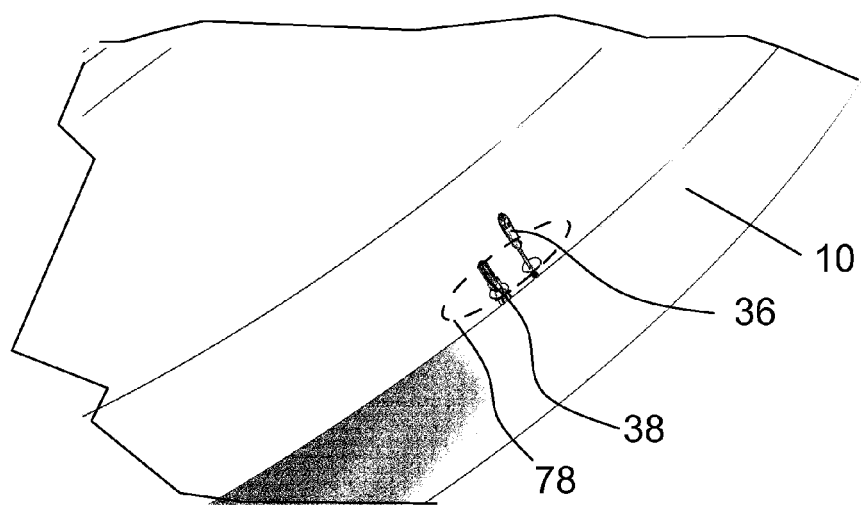
FIG. 5 is a detail of FIG. 3.
Figure 6:
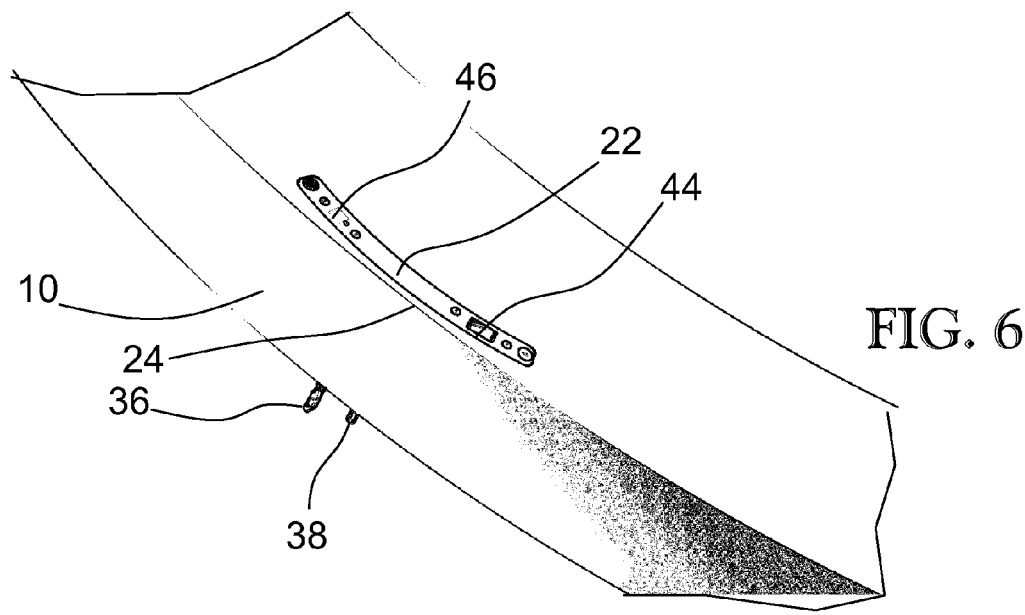
FIG. 6 is a detail of FIG. 4.

FIGS. 5 and 6 are details of FIGS. 3 and 4. A reinforcing structure 78 (illustrated with dashed lines) in the form of a portion with increased thickness may be provided in the vicinity of the recess 22 in order to compensate for the loss of rigidity of the clamping ring 10 resulting from the presence of the recess 22.

The axial height of the housing 34 corresponds to the depth of the recess 22 such that the contact surface of the sensor unit 24 is pressed against the end axial face of the outer ring of the roller bearing 18 when the clamping ring 10 is mounted to the housing.

Figure 7:
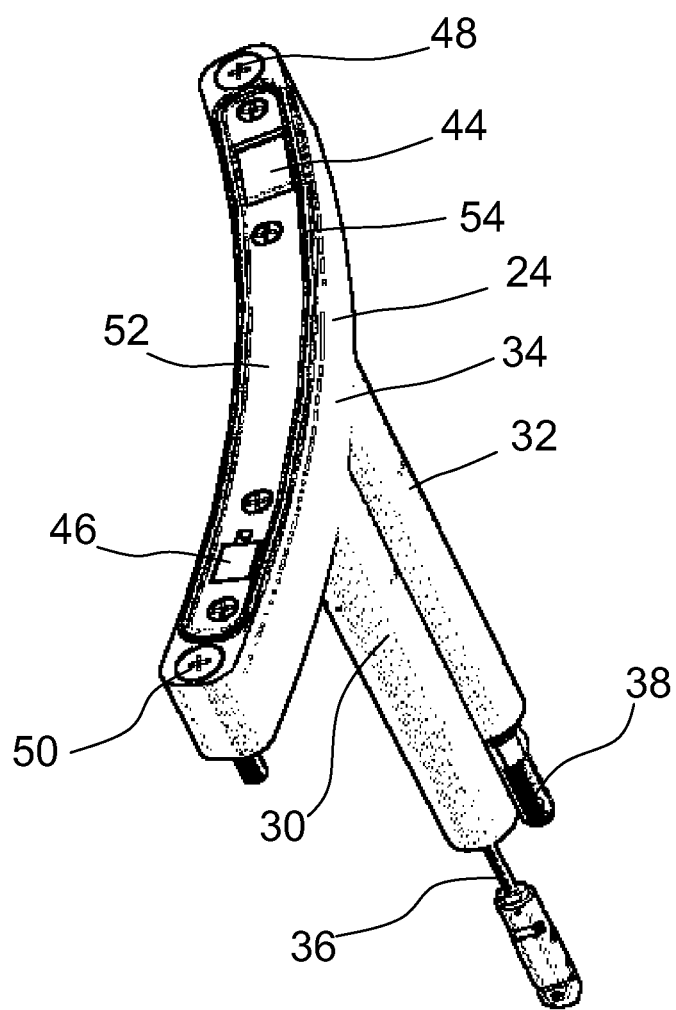
FIG. 7 is a perspective view of the sensor unit in FIGS. 1-6.

FIG. 7 is a perspective view of the sensor unit 24 of FIGS. 1-6 as viewed from the side of the bearing 18.

The sensor unit 24 is equipped with a temperature sensor, a vibration sensor, an acoustic emission (AE) sensor and a strain sensor in the form of a friction strain gauge and two contact plates 44, 46 are provided on the side of the sensor unit 24 facing the outer ring of the bearing 18 in the assembled state in order to establish a good mechanical and thermal contact between the sensors and a bearing 18.

The bottom of the recess 22 is provided with two threaded bores engaging with screws 48, 50 at the ends of the housing 34 of the sensor unit 24. A cover part 52 of the sensor unit 24 has rectangular holes receiving the contact plates 44, 46 and is fixed on the main part of the housing 34 with four further screws. An overmolded O-ring 54 is provided over the entire circumference of the cover part 52 of the housing 34 and is made of soft elastic material so as to prevent the penetration of oil or other liquids into contact area between the contact plates 44, 46 and an axial end face of the bearing outer ring. The cover part 52 with the O-ring 54 serving as a face-seal part is formed in a two-shoot molding process.

Figure 8:
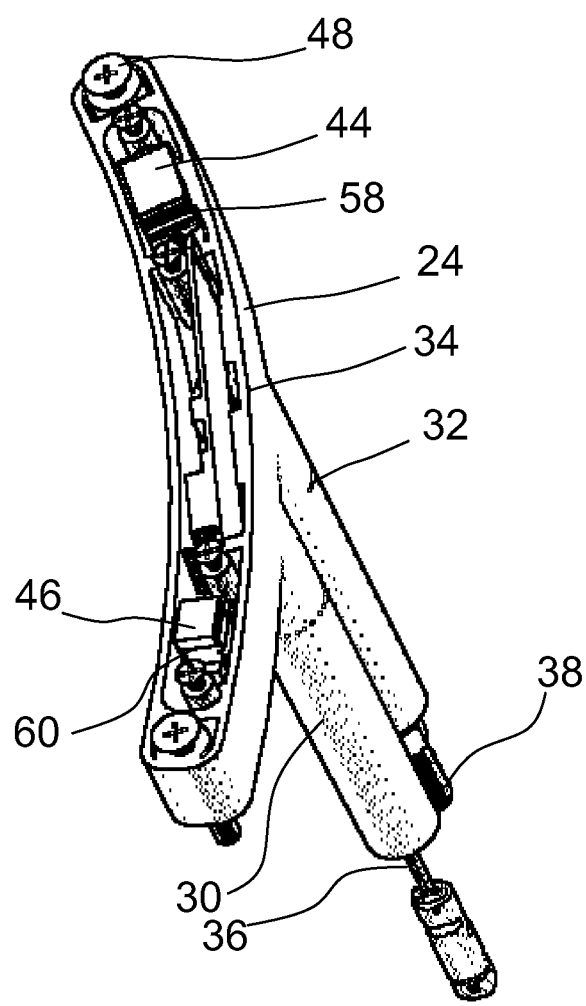
FIG. 8 is a perspective view of the sensor unit in FIGS. 1-6 without its cover plate.

FIG. 8 illustrates the sensor unit 24 with a cover plate 52 removed. A printed circuit board 56 is arranged in the center portion of the housing 34 and a sensor assembly 58, 68 is arranged on the lateral sides respectively.

Figure 9:
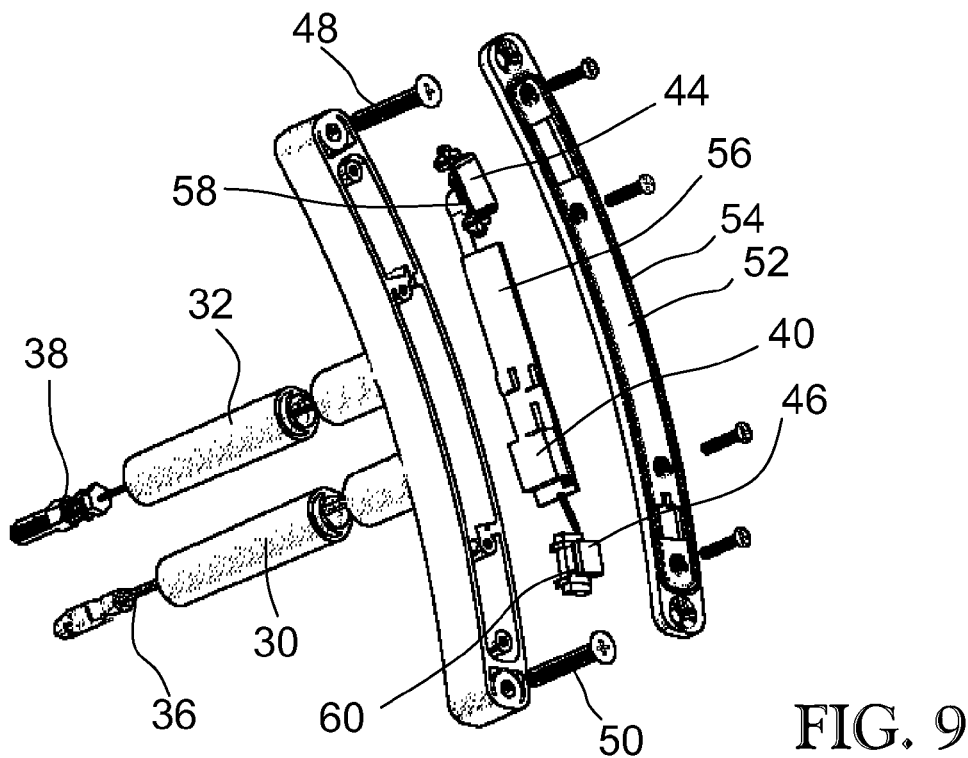
FIG. 9 is an exploded view of the sensor unit of FIGS. 7 and 8.
Figure 10:
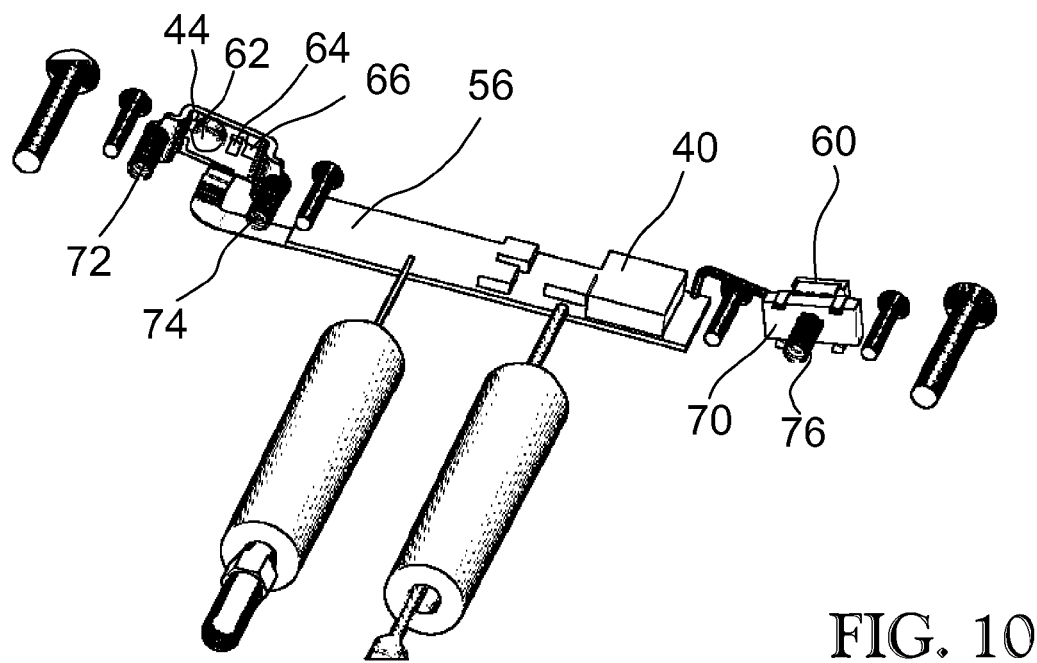
FIG. 10 is a schematic view of a circuit board and sensor assemblies of the sensor unit of FIGS. 8 and 9, taken out of the housing.

FIGS. 9 and 10 are exploded views of the sensor unit 24 of FIGS. 7 and 8 and show the cover part 52 with the O-ring 54, the circuit board 56 with the sensor assemblies 58, 60.

The sensor assembly 58 includes an acoustic emission sensor 62, vibration sensor 64 and a temperature sensor 66, and the sensors 62, 64, 66 are mounted on the metallic contact plate 44.

The second sensor assembly 60 includes a friction strain gauge 70 so as to enable the measurement of strain deformations of the outer ring of the bearing 18. The sensor assembly 58 is preloaded against the axial end face of the bearing with two springs 72, 74 and the friction strain gauge 70 is preloaded with one spring 76.

The sensor assembly and the recesses in the second clamping ring 12 may be identical to the above recess 22 and assembly 24 or dimensionally adapted in an appropriate way.

The invention claimed is:

1. A bearing device comprising:
   a clamping ring adapted to retain and preload a bearing in a housing,
   wherein the clamping ring includes a contact surface which is adapted to come in contact with an axial end face of an outer ring of the roller bearing and a sensor unit including at least one of: a temperature sensor, an acoustic emission sensor, and a vibration sensor for detecting at least one state variable of the bearing,
   wherein the sensor unit includes at least one metallic contact plate for establishing a mechanical and thermal contact between the at least one sensor and the bearing,
   wherein the sensor unit is embedded in a recess of the clamping ring, the recess is open towards the bearing to be retained,
   wherein the sensor unit is fitted axially into the recess such that the least one contact plate of the sensor unit is flush with the contact surface of the clamping ring and is in direct contact with the axial end face of the outer ring of the bearing.

2. The bearing device according to claim 1, wherein the outer diameter of the bearing is at least 300 mm.

3. The bearing device according to claim 1, wherein the bearing is formed as a double-row taper roller bearing in an O-configuration.

4. The bearing device according to claim 1, wherein the sensor unit is equipped with a wireless transmitter for transmitting signals obtained by the sensor unit.

5. The bearing device according to claim 1, wherein the at least one metallic contact plate is provided with an O-ring preventing the penetration of oil or other liquids into a contact area between the contact plate and the axial end face of the bearing.

6. The bearing device according to claim 1, wherein the sensor unit includes an arc-shaped housing.

7. The bearing device according to claim 1, wherein the sensor unit includes at least one strain sensor.

8. The bearing device according to claim 1, wherein the clamping ring comprises a reinforcing structure.

9. A system comprising:
   an apparatus comprising a bearing unit; and
   a control unit configured to:
     control and monitor the apparatus,
   wherein the control unit is configured to receive data from a sensor unit and to generate status information or warning signals based on the received data,
   wherein the bearing device comprises:
     a clamping ring adapted to retain and preload a bearing in a housing, and
     the sensor unit for detecting at least one state variable of the bearing,
     wherein the sensor unit is embedded in a recess of the clamping ring,
     wherein the clamping ring includes a contact surface which is adapted to come in contact with an axial end face of an outer ring of the roller bearing and the sensor unit,
     wherein the sensor unit includes at least one metallic contact plate for establishing a mechanical and thermal contact between the at least one sensor and the bearing, the recess is open towards the bearing to be retained,
     wherein the sensor unit is fitted axially into the recess such that the least one contact plate of the sensor unit is flush with the contact surface of the clamping ring and is in direct contact with the axial end face of the outer ring of the bearing.

* * * * *